(No Model.)
J. H. VANDEVENTER.
NAME PLATE FOR MARKING CARPETS.
No. 290,151. Patented Dec. 11, 1883.
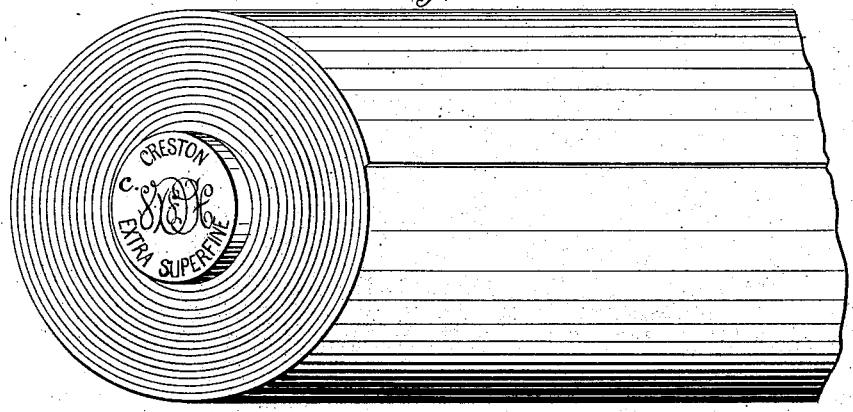
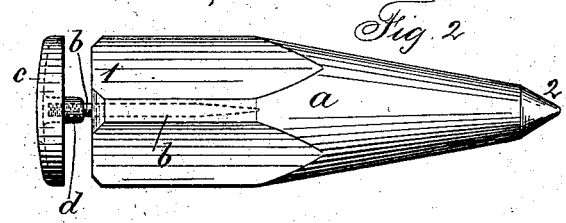
Witnesses:
J. Staub
Chas. H. Smith
Inventor:
Jacob H. Vandeventer
per Lemuel W. Serrell
atty

UNITED STATES PATENT OFFICE.

JACOB H. VANDEVENTER, OF BROOKLYN, ASSIGNOR TO VANDEVENTER & HORNE, OF NEW YORK, N. Y.

NAME-PLATE FOR MARKING CARPETS.

SPECIFICATION forming part of Letters Patent No. 290,151, dated December 11, 1883.

Application filed July 6, 1883. (No model.)

*To all whom it may concern:*

Be it known that I, JACOB H. VANDEVENTER, of Brooklyn, in the county of Kings and State of New York, have invented a new and useful Improvement in Devices for Marking Carpets; and the following is declared to be a description of the same.

Carpets are finished and made in rolls ready for shipment and sale, and it is usual to mark them in some manner, so as to show to the eye of the purchaser the quality of the carpet and the name of the mills where it was made. This has sometimes consisted of a printed tag or ticket that is easily torn off or lost, or a piece of stiff material has been used with attaching wires or barbs.

The object of my invention is to provide a device for marking carpets that shall be cheaply made, quickly applied, secure in position, and not easily removed, and of sufficient prominence and elegance not to be overlooked.

My invention consists in a marking device composed of a rigid plate or medallion, a wooden bar to be thrust into the center of the roll, and a stem passing from the medallion into the wooden peg.

In the drawings, Figure 1 is a perspective view of the end of a roll of carpet, showing the name-plate in position; and Fig. 2 is a plan of the parts.

The bar or piece of wood $a$ is preferably of the shape shown in Fig. 2, with the end 1 made square and the end 2 made pointed or wedge shape, for driving into the center of the roll of carpet at one end, the square end 1 being held in the roll by the binding-pressure of the carpet. The nail $b$ to be driven into the square end 1 of the bar $a$ is preferably made with a screw-thread on one end, similar to a picture-nail.

The name-plate or medallion $c$ may be made square, octagonal, or of other shapes; but it is preferably made circular, and a boss, $d$, is formed on the back with a screw-thread in the same, to secure the name-plate upon the nail $b$. The name-plate $c$ might, however, be made with a hole through it, and be secured upon the bar $a$ with a nail passing through said hole. In either instance the portion $b$ becomes an attaching-stem for the name-plate. Upon the face of the name-plate or medallion I prefer to place the name of the mills, the monogram of the proprietors, and words designating the quality of the goods. The monogram may, however, be left off.

I claim as my invention—

The marking-tag consisting of a wooden bar tapered at one end, a rigid name-plate or medallion, and a metallic stem for attaching the same to the wooden bar, substantially as specified.

Signed by me this 29th day of June, A. D. 1883.

J. H. VANDEVENTER.

Witnesses:
 GEO. T. PINCKNEY,
 HAROLD SERRELL.